July 4, 1939.  R. E. BECHTOLD  2,164,441
FLUID DISPENSING SYSTEM
Filed Feb. 12, 1938

INVENTOR.
REUBEN E. BECHTOLD.
BY Lockwood Goldsmith & Galt
ATTORNEYS.

Patented July 4, 1939

2,164,441

UNITED STATES PATENT OFFICE 2,164,441

FLUID DISPENSING SYSTEM

Reuben E. Bechtold, Fort Wayne, Ind., assignor, by mesne assignments, to S. F. Bowser and Company, Incorporated, Fort Wayne, Ind., a corporation of Indiana Application February 12, 1938, Serial No. 190,158

7 Claims. (Cl. 221—95)

This invention relates to a liquid dispensing system particularly adapted for use in gasoline pumps wherein the liquid or gasoline is metered as it is dispensed.

The object of the invention is to provide a simplified flow system embodying a liquid meter for metering the liquid dispensed, an air eliminator system associated therewith, a pump for forcing the liquid under pressure through said system, and pressure control valves for controlling the flow of liquid and air elimination.

One feature of the invention resides in the provision of a pressure regulating valve in the flow line between, and spaced from, the meter and dispensing nozzle for preventing dispensing of the liquid from the meter until sufficient liquid pressure is built up therein to eliminate accumulated or entrapped air, and wherein said valve is controlled by the difference in pressure between the meter receiving chamber and the atmosphere.

Another feature of the invention resides in providing the meter receiving chamber with a restricted gas and liquid vent in the top cover thereof which may be provided with a valve controlling the same, whereby any air entering the meter chamber will be directly expelled therefrom and not metered.

A further feature of the invention consists in providing a unitary structure embodying the pump, air eliminating float chamber, and by-pass valve.

A further feature of the invention resides in providing in combination with the pressure regulating valve a positive means in the form of a check valve for preventing back flow of the liquid from the flow line as the pressure in the regulating valve drops before it is completely closed. This condition normally occurs during the coasting of the pump from full speed to idleness.

Still a further feature of the invention resides in the provision of a liquid and gas return line discharging into the float chamber below the liquid level thereof.

The construction, functioning and purpose of the above features will be hereinafter more fully set forth and described.

Figure 1:
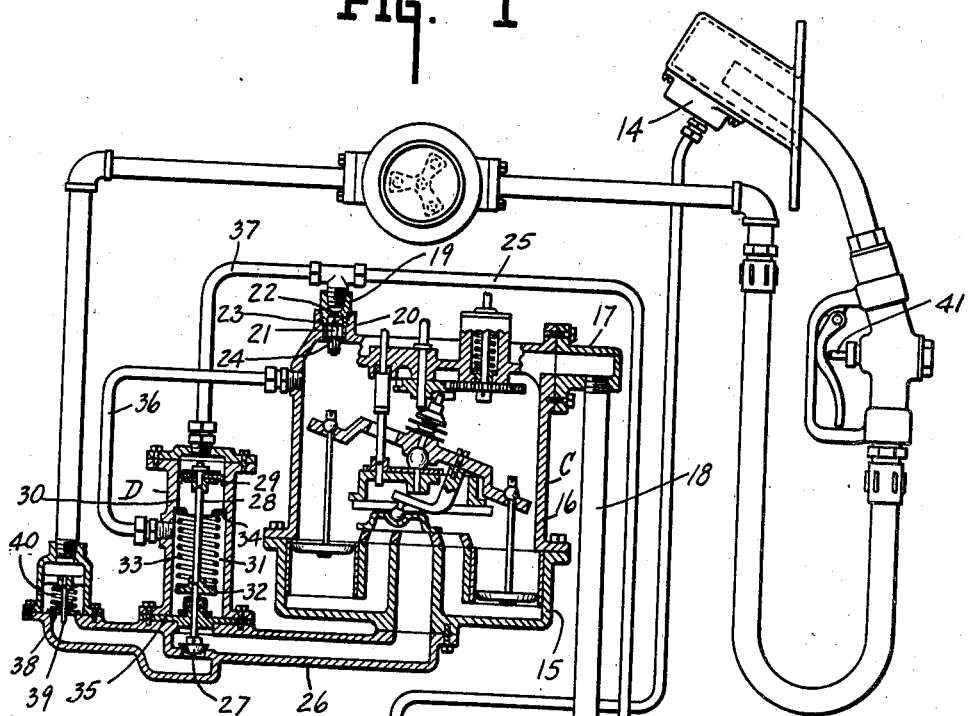
Figure 3:
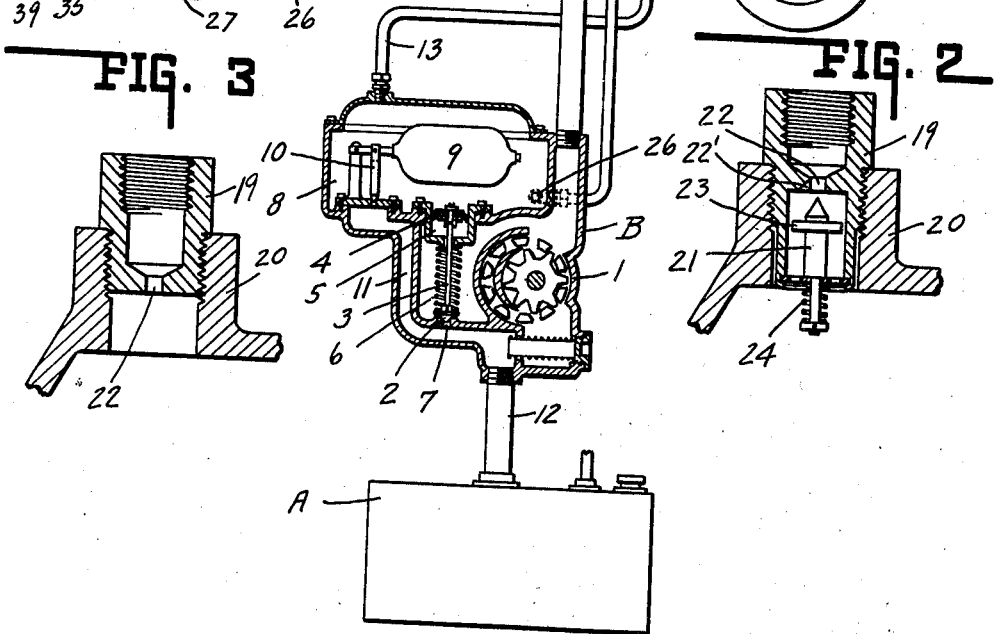
Figure 2:
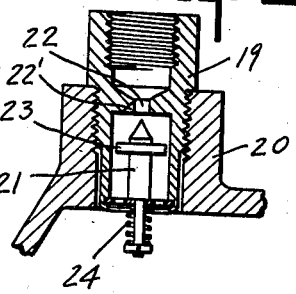

The full nature of the invention will be understood from the accompanying drawing and the following description and claims:

Fig. 1 is a diagrammatical illustration of the system showing parts thereof in central vertical section. Fig. 2 is an enlarged view showing a central vertical section through the valve controlled gas and liquid vent from the meter receiving chamber. Fig. 3 is a modified form illustrating the gas and liquid vent without a valve therein.

In the drawing there is illustrated a liquid dispensing system embodying a liquid storage tank A; and a housing B containing a pump, an air separating float chamber, and a spring-restrained by-pass valve for said pump. Connected therewith there is a housing C embodying a liquid meter for metering the liquid dispensed. Between the meter housing C and the discharge nozzle there is a housing D containing a spring-restrained regulating valve.

The housing B contains a rotary pump 1 of the usual well known character, which may be rotated by the usual electric motor receiving energy from a source of current and controlled by the usual switch, not shown, as well understood in the art. Associated with said pump there is provided a by-pass valve head 2 mounted upon a valve stem 3 having at the opposite end thereof a piston or plunger 4 which reciprocates in a cylinder 5. Between the head 2 and the cylinder 5 there is provided a restraining spring 6 for normally holding the valve head in closed position for closing the valve port 7. The valve port 7 provides communication between the pressure and suction chambers of the pump. The underside of the piston or plunger 4 is in communication with the pressure chamber of the pump, whereas the opposite side thereof is open to the atmosphere. Thus, upon the pressure of liquid in the pressure chamber of the pump being sufficient to overcome the tension of the spring 6 through the pressure applied thereby to the underside of the piston 4, the valve head 2 will be lifted from its seat to open the valve port 7 and permit the liquid to be by-passed from the pressure chamber to the suction chamber. This is for the purpose of preventing stalling of the motor when the flow of liquid from the system is discontinued.

Also provided in the pump housing B there is an air eliminating float chamber 8 in which the float 9 is suitably mounted to raise and lower the valve stem 10. The valve stem 10, when the float is in its lowered position due to a low level of liquid contained in said chamber, closes a port between the float chamber and conduit 11, the conduit communicating with the suction side of the pumps and the suction conduit or line 12 leading from the bottom of the storage tank A. The float chamber 8 is provided with an air vent in the form of a conduit or pipe 13 leading to the atmosphere through a nozzle support 14.

The meter housing C includes a cylinder casting 15 and a cover casting 16 secured thereto. Secured to the cover casting 16 there is a flanged connection 17 to which a liquid supply conduit 18 is connected leading from the pressure chamber of the pump 1 in the housing B. Mounted within the housing C there is provided a liquid meter of that type having a wabble plate and a plurality of pistons or plungers operating in cylinders formed in the casting 15, the ports of which are controlled by a sliding valve, which in turn is controlled by the wabble plate through which the meter registering mechanism is actuated. The mechanism of said meter is of the same character and operates in the same manner as heretofore disclosed and more specifically described in Letters Patent to Bechtold No. 2,021,882, issued November 26, 1935, entitled "Meter for liquids", and also as shown and described in Letters Patent to Bechtold No. 1,930,438, issued October 10, 1933, entitled "Liquid dispenser".

The valve controlled gas and liquid vent from the meter receiving chamber comprises a valve nipple 19 secured within the boss 20 of the meter housing cover 16, and extending from the top thereof.

Movably mounted within the nipple there is a valve 21 adapted to seat upon the valve seat 22 for controlling the passage of gas and liquid from the meter receiving chamber. The stem of said valve is provided with a flange 23 forming a piston or plunger like surface such as to be engaged by up-surging gas or liquid for lifting the valve into seated position against the tension of a spring 24. Said spring 24 is positioned between the flange on the lower end of the stem and a fixed valve guide positioned in the nipple 19. Thus, the spring 24 normally holds the valve 21 in open position but permits it to be moved to seated position when the surging pressure of the liquid exerted on the plunger overcomes the tension of the spring. A small notch indicated at 22' is provided in the seat 22 for providing a small restricted passageway for the escape of liquid and gas through the valve port when the valve 21 is in seated position. The valve body or nipple 19 is connected with the return conduit 25 for conveying escaping gas and liquid back to the float chamber 8 in the pump housing B. It is to be noted that said return conduit 25 communicates with the float chamber 8 at a position below the liquid level in said float chamber as controlled by the float 9, thus providing a liquid seal to prevent back flow of gas or air into the meter receiving chamber, and thereby prevent draining of the meter receiving chamber.

The meter housing C is provided with a main discharge port to which is connected with the main flow conduit 26. Thus, the fluid received in the meter receiving chamber is forced by the pressure exerted by the pump 1 through a port opened by the meter slide valve to fill the metering cylinder. The plunger actuating force is produced by the pressure of the liquid on top of the respective plungers, forcing them downwardly to expel the predetermined quantity of liquid with which the cylinder has been filled. When the valve moves to the opposite position, the port will be closed to the receiving chamber, but open to the main outlet leading into the flow conduit 26 through which such predetermined quantity of liquid is discharged upon the piston or plunger moving to its lowermost position in the cylinder.

The flow through said main conduit 26 is controlled by a regulating valve 27 adapted to open and close a port in said conduit positioned between the meter and the discharge nozzle, and spaced therefrom. Said valve is controlled by mechanism contained in the housing D comprising a valve stem 28 extending therein upon one end of which there is provided a piston or plunger 29 movable in the cylinder 30 formed in said housing. The housing encloses a pressure chamber 31 in communication with said cylinder. Spaced from the piston 29 on the stem 28 there is a collar 32 secured thereon. A restraining spring 33 has one end bearing upon the collar 32 and the other end upon a spring retaining ring 34 extending into the chamber 31 and positioned at the lower end of the cylinder 30. The chamber 31 is closed at its bottom by a plate 35 through which the stem 28 slides so that the pressure in said chamber is not communicated to the flow conduit 26.

The chamber 31 is connected by a conduit 36 to the upper portion of the meter housing cover 16 so that the meter receiving chamber is in communication therewith below the piston 29. A conduit 37 connects the upper end of the cylinder 30 on the opposite side of the piston 29 with the atmosphere through the conduit 25, float chamber 8 and conduit 13. Thus, atmospheric pressure is exerted on the upper side of the piston and the pressure in the meter receiving chamber exerted on the lower side thereof. When the pressure in the meter chamber rises by the action of the pump to overcome the atmospheric pressure and the tension of the spring 33, the valve 27 opens and permits flow of metered liquid through the conduit 26.

Also positioned in said flow conduit 26 between the regulating valve 27 and the nozzle there is provided a check valve 38 adapted to slide upon a stem 39 against the tension of a spring 40. The pressure of the liquid required to open the valve 27 is more than ample to open the check valve and permit dispensing thereof through the nozzle when the nozzle control valve 41 is open. However, the check valve serves to prevent back flow of the liquid through the flow line, while the pressure in the regulating valve is dropping due to the coasting of the pump from full speed to idle position.

The operation of the system may be described as follows:

When idle, the various valves are in the position shown in the drawing, all closed with the exception of the gas vent valve 21 which is normally open. Upon starting the motor to dispense the liquid, pressure will be developed by the pump 1 in the pressure chamber of the pump. Liquid will be forced into the meter C. When the chamber of the meter C is filled with liquid, the continued pumping action will exert a pressure thereon which will cause the liquid to surge past the flange 23 on stem of valve 21 and through the valve seat 22 in the nipple 19 and be returned through the conduit 25 to the float chamber 8. Thus, the accumulated gas or air in the meter chamber will be forced therefrom and discharged to the atmosphere from the float chamber through the conduit 13. This surging action of the liquid, however, will lift the valve 21 so that it will seat and thereby restrict the passageway through the valve seat 22 to the reduced orifice provided by the notch formed therein. Thus, the passageway through the valve seat 22 will never be closed, but will merely be more restricted. This prevents further surging of appreciable quantities of liquid therethrough to be returned to the float chamber, but will permit the free escape of any air or gas entrapped in the liquid, together with a small amount of liquid carried thereby. The liquid pressure built up in the meter will be transmitted to the regulating valve D through the conduit 36 so as to raise the valve 27 from its seat and thereby open the flow line 26 from the meter to the nozzle. Assuming the nozzle valve 41 still remains closed so that no liquid is being dispensed while the pump 1 continues to operate, further pressure in the system will cause the by-pass valve 2 to be lifted from its seat so that the liquid will merely be by-passed about the pump, thus limiting the maximum liquid pressure in the system.

Upon opening of the nozzle valve 41 for dispensing, the pressure in the system will cause the liquid to pass through the meter, operating the meter to measure it and record the quantity of liquid passing therethrough in the usual manner. The liquid passing through the meter is free to pass through the flow line 26, past the open regulating valve 27 and the check valve 38. During this action the pressure of liquid in the meter chamber will hold the valve 21 in its seated position, but any entrapped air will continue to escape through the reduced opening provided by the notch in the valve seat 22. This air and liquid or vapor carried thereby will be returned to the float chamber and there separated so that the air will be carried off through the air vent 13 while the liquid accumulates until it reaches the float 9, opening the float valve to permit it to be drawn back in the suction chamber of the pump. The valve 21 also permits freedom of expansion or contraction of the liquid during periods of idleness by reason of it being open to the atmosphere through the float chamber and air vent conduit 13.

As shown in the modified form of Fig. 3, the same restricted air passageway is employed but without the valve for further restricting it, the only purpose of the valve being to limit or reduce the flow of gas and liquid when the meter chamber is under liquid pressure, whereby slightly less liquid need be pumped into the meter to obtain the same quantity of liquid material thereby.

It is to be noted that in dispensing systems heretofore employed, wherein the air separator precedes the meter or its receiving chamber, as disclosed in the Bechtold Patents No. 1,826,340, issued October 6, 1931, and No. 1,868,444, issued July 19, 1932, it is possible under severe conditions that a certain amount of air will be carried from the separator into the meter. Since there is no provision for escape of air from the meter receiving chamber of said system, such air as escapes thereto will pass through the meter and affect the accuracy of the liquid measure. It was proposed to avoid this condition by the structure shown in Bechtold Patent No. 1,930,438, wherein the meter chamber is open to the air separator. The objection to such an arrangement lies in the fact that the passage leading from the meter chamber is not sufficiently restricted and the check valve in the discharge outlet is insufficient to maintain a pressure to force the entrapped air from the liquid. The system herein disclosed is an improvement upon the above-mentioned systems and is designed to build up the required pressure for eliminating entrapped air from the meter by providing a regulating valve controlled by the pressure of liquid in the meter, and a restricted air vent or passageway in the immediate top of the meter whereby the pressure thus built up in the meter will forcibly eliminate entrapped air.

The invention claimed is:

1. A liquid dispensing system having a flow line including a storage tank, a discharge nozzle, a pump for forcing liquid from the tank to the nozzle, a liquid meter in said flow line between the pump and nozzle having a liquid receiving chamber provided with a restricted passageway in the top thereof, a float chamber associated with said pump having a float controlled port communicating with the suction side thereof, an air vent conduit leading from the top of said float chamber open to the atmosphere, and a conduit leading from said restricted passageway to said float chamber below the float controlled liquid level thereof.

2. A liquid dispensing system having a flow line including a storage tank, a discharge nozzle, a pump for forcing liquid from the tank to the nozzle, a liquid meter in said flow line between the pump and nozzle having a liquid receiving chamber provided with a restricted passageway in the top thereof, a float chamber associated with said pump having a float controlled port communicating with the suction side thereof, an air vent conduit leading from the top of said float chamber open to the atmosphere, a conduit leading from said restricted passageway to said float chamber below the float controlled liquid level thereof, a valve housing spaced from said meter chamber, and a valve in said housing controlling the passage of liquid from said meter chamber to the nozzle controlled by the liquid pressure in said chamber.

3. A liquid dispensing system having a flow line including a storage tank, a discharge nozzle, a pump for forcing liquid from the tank to the nozzle, a liquid meter in said flow line between the pump and nozzle having a liquid receiving chamber provided with a restricted passageway in the top thereof, a float chamber associated with said pump having a float controlled port communicating with the suction side thereof, an air vent conduit leading from the top of said float chamber open to the atmosphere, a conduit leading from said restricted passageway to said float chamber below the float controlled liquid level thereof, and a choke valve in said restricted passageway actuated by the flow of liquid therethrough for varying the effective area thereof.

4. A liquid dispensing system having a storage tank, a housing containing a pump, a spring restrained by-pass valve and an air separating chamber therein, said housing having a conduit communicating with the storage tank and the suction side of said pump, a float controlled valve in said chamber for controlling the passage of liquid to the suction side of the pump, a vent pipe leading from the top of said chamber to the atmosphere, a meter housing spaced from said housing having metering mechanism therein, a conduit connecting the pressure side of said pump with the top of the meter housing, a conduit connected with the bottom of said meter housing for discharge of metered liquid, a housing spaced from said meter housing having a regulating valve therein for controlling the flow of liquid through said discharge conduit, and an air and a liquid and gas escape conduit leading from the top of said meter housing to said separating chamber.

5. A liquid dispensing system having a storage tank, a housing containing a pump, a spring restrained by-pass valve and an air separating chamber therein, said housing having a conduit communicating with the storage tank and the suction side of said pump, a float controlled valve in said chamber for controlling the passage of liquid to the suction side of the pump, a vent pipe leading from the top of said chamber to the atmosphere, a meter housing spaced from said housing having metering mechanism therein, a conduit connecting the pressure side of said pump with the top of the meter housing, a conduit connected with the bottom of said meter housing for discharge of metered liquid, a housing spaced from said meter housing having a regulating valve therein for controlling the flow of liquid through said discharge conduit, a piston in said regulating valve housing for opening and closing said valve, a conduit leading from said meter housing to said valve housing on one side of the piston, and a conduit leading from the other side of said piston through said float chamber to the atmosphere and in communication with a restricted passageway in the top of said meter housing.

6. A liquid dispensing system having a pump housing provided with a pump therein, a liquid reservoir communicating with the suction side of said pump, an air separating chamber in said pump housing having a float controlled passageway in communication with said suction side of said pump, an air vent from the top of said chamber to the atmosphere, a meter housing spaced therefrom having a main discharge conduit leading from the bottom thereof, an intake conduit connecting the top thereof with the pressure side of said pump, liquid metering mechanism in said meter housing, a spring restrained by-pass valve in said pump housing, and a spring restrained regulating valve in said discharge conduit.

7. A liquid dispensing system having a pump housing provided with a pump therein, a liquid reservoir communicating with the suction side of said pump, an air separating chamber in said pump housing having a float controlled passageway in communication with the suction side of the pump, an air vent from the top of said chamber to the atmosphere, a meter housing spaced therefrom having a main discharge conduit leading from the bottom thereof, an intake conduit connecting the top thereof with the pressure side of said pump, liquid metering mechanism in said meter housing, a spring restrained by-pass valve in said pump housing, a spring restrained regulating valve in said discharge conduit, said regulating valve including a piston control therefor, a pressure line connecting said meter housing with one side of said piston, and a pressure line connecting the other side of said piston with the atmosphere through the separating chamber.

REUBEN E. BECHTOLD.